United States Patent [19]
Morgan et al.

[11] Patent Number: 5,274,034
[45] Date of Patent: Dec. 28, 1993

[54] POLYCARBONATE POLYSTYRENE COMPOSITION

[75] Inventors: Sarah E. Morgan, Evansville, Ind.; Charles F. Pratt, Brasschaat, Belgium; Constantinus L. J. A. Verbraak, Steenbergen, Netherlands; Stanley Y. Hobbs, Scotia, N.Y.; Edward J. Fewkes, Jr., Belpre, Ohio

[73] Assignee: General Electric Company, Pittsfield, Mass.

[21] Appl. No.: 886,920

[22] Filed: May 22, 1992

[30] Foreign Application Priority Data
Jun. 19, 1991 [EP] European Pat. Off. ........ 91110068.3

[51] Int. Cl.$^5$ .................. C08L 69/00; C08L 25/06; C08L 51/04
[52] U.S. Cl. ........................ 525/67; 525/92; 525/133; 525/147; 525/148
[58] Field of Search ............. 525/67, 92, 133, 147, 525/148

[56] References Cited

U.S. PATENT DOCUMENTS

| 4,590,241 | 5/1986 | Hohlfeld | 525/68 |
| 4,885,335 | 12/1989 | Gallucci | 525/67 |
| 4,895,897 | 1/1990 | Kaufman | 525/147 |
| 5,055,523 | 10/1991 | Inoue | 525/147 |
| 5,179,161 | 1/1993 | Saito | 525/148 |

Primary Examiner—David J. Buttner

[57] ABSTRACT

The invention relates to polymer compositions comprising an aromatic polycarbonate, an aromatic polycarbonate with acid or ester functionality, a styrene based polymer and a styrene polymer with oxazoline groups. The polymer composition of the invention is suitable for molding objects with a mat surface.

7 Claims, No Drawings

POLYCARBONATE POLYSTYRENE COMPOSITION

The invention relates to a polymer composition comprising (A) an aromatic polycarbonate and (B) polystyrene or rubber modified polystyrene.

The invention also relates to objects molded from said composition.

The above mentioned polymer compositions have interesting properties.

For some applications it is a disadvantage that parts molded from said compositions have a surface with a high gloss. Several proposals have been made to obtain compositions with a lower gloss. To this end it is known to incorporate in polymer compositions rubbery materials wherein the rubber particles meet certain requirements.

The addition of certain ingredients to lower the gloss is also known. U.S. Pat. No. 4,885,335 describes blends of an aromatic polycarbonate, an acrylonitrile-styrene-acrylate interpolymer and a gloss reducing amount of a glycidyl (meth)acrylate copolymer.

The invention is based on the discovery that incorporation of two specific type of additives that can react together under the usual conditions of the preparation for the composition and/or the subsequent molding step results in composition giving molded objects with a mat surface.

The polymer composition according to the invention comprises besides the above mentioned components (A) and (B):

(C) an aromatic polycarbonate with reactive carboxylic acid groups, or ester groups thereof and
(D) a styrene based polymer with repeating units containing a pendant cyclic iminoethergroup, the quantities of the constituents A,B,C and D with respect to the sum of A,B,C and D together being chosen as follows:
10-85% by weight of A;
10-85% by weight of B;
2,5-85% by weight of C and
2,5-85% by weight of D.

U.S. Pat. No. 4,590,241 describes polymer blends containing normally incompatible polymers prepared by incorporating therein one polymer with repeating units containing pendant cyclic iminoether groups to form a first reactive polymer and another reactive polymer having coreactive groups to form a second reactive polymer which is capable of reacting with said first reactive polymer to form linkages between the polymers. Said blend is characterized by said first or second reactive polymer being blended or extended with miscible polymer(s) to form a reactive blend thereof.

No mention is made of the presence of aromatic polycarbonate and/or the surface appearance of molded parts.

Components (C) and (D) are preferably each present in a minimum quantity of 5% by weight. Components (C) and (D) have by preference each on average more than one reactive group per molecule.

The polymer composition, either before or after the molding step, preferably has a gel content of 2-10% by weight. The gel content is the insoluble part after extraction with $CHCl_3$.

The invention further deals with products made out of the polymer composition according to the invention.

The polymer composition according to the invention should comprise at least one component chosen from each of the mentioned groups of components A,B,C and D.

A. Aromatic polycarbonate

Aromatic polycarbonates are a well known class of polymers. They are usually obtained by reaction of a carbonate precursor such as phosgene with an aromatic bisphenol like bisphenol A. Aromatic polycarbonates suitable for the polymer composition according to the invention include the generally known aromatic polyester carbonates, block copolymers having aromatic carbonate blocks and blocks having siloxane units, or block copolymers having aromatic carbonate blocks and alifatic carbonate blocks. Blends of two or more of such compounds are also possible.

B. Polystyrene or rubber modified polystyrene

Polystyrene and rubber modified polystyrene (HIPS) are widely known. Any of the usual types can be used in the polymer composition according to the invention.

C. Aromatic polycarbonate with reactive carboxylic acid groups and/or ester groups thereof.

Above mentioned polymers and a method for their preparation have been described in EP-A-312,811. They are prepared by incorporating an carboxylic acid substituted phenol as chain stopper in the polycarbonate forming reaction.

Aromatic polycarbonates with two reactive carboxylic acid groups at the end of the polymer chain have been described in EP-A-270,809. These polycarbonates are also suitable for the polymer composition according to the invention.

D. Styrene based polymer with repeating units containing a pendant cyclic imino-ether group.

This type of polymer has been described in U.S. Pat. No. 4,590,241. The content of cyclic imino-ether groups is preferably above 2% by weight.

In addition to the above mentioned components the polymer composition according to the invention can comprise further polymers such as ABS, MBS, SAN or block copolymers with rubbery and non-rubbery blocks. Examples of the last mentioned block copolymers are A-B-A block copolymers in which A represents a polystyrene block and B a hydrogenated or non-hydrogenated polydieen block.

The polymer composition according to the invention can further comprise one or more additives. Examples of suitable additives are fillers, reinforcing fillers, such as glass fibers, mold release agents, stabilizers, UV-absorbents, pigments and dyes.

The composition, with respect to the sum of A, B, C and D together is preferably as follows:
10-70% by weight of A;
10-70% by weight of B;
5-15% by weight of C and
5-15% by weight of D.

The polymer composition according to the invention is preferably prepared by compounding in an extruder. The obtained composition is preferably molded into products by injection-molding.

EXAMPLE I

In the example the following ingredients have been used:

PC-1: a polycarbonate based on bisphenol-A and phosgene with a molecular weight of (weight average) of 18,000

PC-2: as PC-1, but with a molecular weight of 22,500.

PC-3: as PC-1, but with a molecular weight of 24,500.
PC-4: as PC-1, but with a molecular weight of 35,000.
HIPS-1: a high impact polystyrene with a rubber content of 9% and a rubber particle size of about 2 micrometers.
HIPS-2: a high impact polystyrene with a rubber particle size of about 2.5 micrometer.
HIPS-3: a high impact polystyrene with a rubber content of 13% and a rubber particle size of about 4 micrometer.
HIPS-4: a high impact polystyrene with a rubber particle size of about 8 micrometer.
PC-COOH: an aromatic polycarbonate according to EP 312,811 with a molecular weight of approximately 24,000 endcapped with COOH groups or the t-butyl ester thereof.
r PS: a polystyrene with 5% by weight of oxazoline groups according to U.S. Pat. No. 4,590,241
MBS: a graft copolymer with a backbone mainly consisting of butadiene upon which styrene and methylmethacrylate have been grafted.
SBS: a blockcopolymer with two styrene blocks and a central butadiene block.

The ingredients were compounded, together with 3% by weight of pigments, in the quantities as indicated in table 1, in a twin screw extruder with an average temperature setting of 255°–265° C. when a carboxylated polycarbonate was used and of 268°–275° C. when the t-butyl ester thereof was used. (The higher temperature results in a decomposition of the ester into the free carboxylic acid group).

From the obtained compositions were manufactured test pieces by injection molding for determining the gloss (according to ASTM D-523) at a reflectance of 60°, for determining the Izod Notched Impact (INI) at room temperature, (according to ASTM D-256) and the falling dart impact (FDI) at room temperature (according to DIN 53443)

The found values are also indicated in table 1

As can be clearly seen from table 1, the comparative compositions a–h all have a higher gloss as compared to compositions 1–13 according to the invention. Even comparative composition h, comprising a HIPS that helps in reducing gloss has a gloss value far above the values of the compositions according to the invention.

Compositions 11, 12 and 13 show that it is possible to improve the impact properties, while maintaining a low gloss.

EXAMPLE II

A second series of experiments was run while using the following components:
PC-5: an aromatic polycarbonate derived from bisphenol-A and phosgene with an average molecular weight Mn of 23,000 and Mw of 55,000.
PS: a polystyrene with a molecular weight over 100,000.
PC-COOH: see example I; in the ester form ("ester") or in the form of the free acid ("COOH")
rPS-1: polystyrene with 1% by weight oxazoline groups
rPS-2: polystyrene with 4% by weight oxazoline groups.

The compositions according to this example were compounded on a 20 millimeter counter-rotating, non-intermeshing twin screw extruder (highest temp. setting about 260° C.). The obtained compounds were injection molded into a standard bar for Izod impact testing. The surface gloss at 60° was measured.

The gel-content of the obtained compounds was determined by extraction with $CHCL_3$ under reflux conditions, 72 hours, in a Soxhlet extractor. The insoluble part (the gel) was dried and weighed.

The compositions and the found results are reported in table 2.

TABLE 2

| | Composition | | | | |
|---|---|---|---|---|---|
| | i | 14 | 15 | 16 | 17 |
| Component (parts by weight) | | | | | |
| PC-5 | 70 | 60 | 60 | 60 | 60 |
| PS | 30 | 20 | 20 | 20 | 20 |
| PC-COOH | | | | | |
| (COOH) | — | — | 10 | — | 10 |
| (ester) | — | 10 | — | 10 | — |
| rPS-1 | — | 10 | 10 | — | — |
| rPS-2 | — | — | — | 10 | 10 |
| Properties | | | | | |
| Gloss | 98 | 78 | 85 | 50 | 50 |
| % Gel | 0 | 0 | 0 | 3.5 | 6.2 |

The gloss values reported in table 2 cannot be compared with those in table 1 since crystal clear polysty-

TABLE 1

| | Composition No. | | | | | | | | | | | | | | | | | | | | |
|---|---|---|---|---|---|---|---|---|---|---|---|---|---|---|---|---|---|---|---|---|---|
| | A | B | C | D | E | F | G | H | 1 | 2 | 3 | 4 | 5 | 6 | 7 | 8 | 9 | 10 | 11 | 12 | 13 |
| Component (parts by weight) | | | | | | | | | | | | | | | | | | | | | |
| PC-1 | 70 | — | — | — | — | — | — | — | 60 | — | — | — | — | — | — | — | — | — | — | — | — |
| PC-2 | — | 70 | 70 | 70 | — | — | — | — | — | 60 | 60 | 60 | — | — | — | — | — | — | — | — | — |
| PC-3 | — | — | — | — | 70 | 70 | 70 | — | — | — | — | — | 60 | 60 | 60 | — | 60 | 60 | 60 | 60 | 60 |
| PC-4 | — | — | — | — | — | — | — | 70 | — | — | — | — | — | — | — | 60 | — | — | — | — | — |
| HIPS-1 | 30 | 30 | — | — | 30 | — | — | — | 20 | 20 | — | — | 20 | — | — | — | — | — | — | — | — |
| HIPS-2 | — | — | 30 | — | — | — | 30 | — | — | — | 20 | — | — | 20 | — | 20 | — | 20 | 10 | 18 | 19 | 16 |
| HIPS-3 | — | — | — | 30 | — | — | — | — | — | — | — | 20 | — | — | — | — | — | — | — | — | — |
| HIPS-4 | — | — | — | — | — | 30 | — | 30 | — | — | — | — | — | — | 20 | — | 20 | — | — | — | — |
| PC-COOH | — | — | — | — | — | — | — | — | 10 | 10 | 10 | 10 | 10 | 10 | 10 | 10 | 10 | 10 | 10 | 10 | 10 |
| rPS | — | — | — | — | — | — | — | — | 10 | 10 | 10 | 10 | 10 | 10 | 10 | 10 | 10 | 10 | 10 | 10 | 10 |
| MBS | — | — | — | — | — | — | — | — | — | — | — | — | — | — | — | — | — | — | 7 | — | 7 |
| SBS | — | — | — | — | — | — | — | — | — | — | — | — | — | — | — | — | — | — | — | 5 | 5 |
| Properties | | | | | | | | | | | | | | | | | | | | | |
| Gloss | 78 | 85 | 79 | 58 | 77 | 63 | 74 | 34 | 12 | 9.7 | 12 | 9.6 | 16 | 21 | 12 | 19 | 10 | 12 | 10 | 20 | 12 |
| INI (J/m) | — | — | — | — | — | — | — | — | — | — | — | — | — | — | — | — | 83 | — | 610 | 520 | 570 |
| FDI (J) | 2.6 | 2.2 | 13 | — | — | — | — | — | — | 4.8 | 45 | — | — | — | — | — | 4.2 | — | 96 | 14 | 88 | rene was substituted for high impact polystyrene and no pigments were added in the blends according to example II. Both changes result in inherently higher overall gloss levels than those shown by the samples in example I.

As can be seen from table 2 the presence of a gel seems to be beneficial to lower the gloss.

All patents mentioned herein are herewith incorporated by reference.

What is claimed is:

1. Polymer composition comprising (A) an aromatic polycarbonate and (B) polystyrene or rubber modified polystyrene, wherein the composition further comprises
   (C) an aromatic polycarbonate endcapped with reactive carboxylic acid groups, and/or ester groups thereof and
   (D) a styrene based polymer with repeating units containing a pendant cyclic imino-ethergroup, the quantities of the constituents A,B,C and D with respect to the sum of A,B,C and D together being chosen as follows:
   10–85% by weight of A;
   10–85% by weight of B;
   2,5–85% by weight of C and
   2,5–85% by weight of D.

2. Polymer composition according to claim 1, wherein components C and D are each present in a quantity at least 5% by weight.

3. Polymer compositions according to claim 1, wherein components C and D each have on average more than one reactive group per molecule.

4. Polymer composition according to claim 1, wherein the composition has a gel content, as determined by extracting all components soluble in $CHCL_3$ and determining the weight of insolubles, of 2–10% by weight.

5. Polymer composition according to claim 1, wherein the composition further comprises one or more of the following polymers: ABS, MBS, SAN or block copolymers with rubbery and non-rubbery blocks.

6. Polymer composition according to claim 1 wherein the composition further comprises one or more additives.

7. Products made out of the polymer composition according to claim 1.

* * * * *